(12) United States Patent
Crispino

(10) Patent No.: US 9,622,531 B1
(45) Date of Patent: Apr. 18, 2017

(54) IMPACT INDICATOR FOR SPORTS EQUIPMENT

(71) Applicant: Anthony D. Crispino, Mooresville, NC (US)

(72) Inventor: Anthony D. Crispino, Mooresville, NC (US)

( * ) Notice: Subject to any disclaimer, the term of this patent is extended or adjusted under 35 U.S.C. 154(b) by 59 days.

(21) Appl. No.: 14/520,334

(22) Filed: Oct. 21, 2014

(51) Int. Cl.
*A42B 3/04* (2006.01)
*G01P 15/06* (2006.01)
*A42B 3/06* (2006.01)
*G08B 5/36* (2006.01)

(52) U.S. Cl.
CPC ............. *A42B 3/067* (2013.01); *G01P 15/06* (2013.01); *G08B 5/36* (2013.01)

(58) Field of Classification Search
CPC ........... A42B 3/00; A42B 3/04; A42B 3/0453; A42B 3/046; A42B 3/067; B65D 79/02; G01L 5/0052; G01P 15/03; G01P 15/036; G01P 15/04; G01P 15/06
USPC ........................................................ 116/203
See application file for complete search history.

(56) References Cited

U.S. PATENT DOCUMENTS

| 3,136,293 A * | 6/1964 | Schmitt | G01P 15/06 |
| | | | 116/203 |
| 3,515,091 A * | 6/1970 | Smith | G01P 15/036 |
| | | | 116/203 |
| 5,343,569 A * | 9/1994 | Asare | A42B 3/0433 |
| | | | 2/411 |
| 5,400,610 A * | 3/1995 | Macedo | A45C 11/20 |
| | | | 116/216 |
| 6,301,718 B1 * | 10/2001 | Rigal | A42B 3/046 |
| | | | 2/411 |
| 7,328,462 B1 * | 2/2008 | Straus | A42B 3/067 |
| | | | 2/411 |
| 7,509,835 B2 * | 3/2009 | Beck | A42B 3/046 |
| | | | 2/425 |
| 8,387,552 B2 * | 3/2013 | Branch | G01L 5/0052 |
| | | | 116/203 |

(Continued)

FOREIGN PATENT DOCUMENTS

| FR | 2982461 A1 * | 5/2013 | ............ A42B 3/067 |
| WO | WO 2013063684 A1 * | 5/2013 | ............ A42B 3/046 |

OTHER PUBLICATIONS

Battle Sports Science. Web-page: http://www.battlesportsscience.com/products/impact-indicator/about-the-indicator/.

(Continued)

*Primary Examiner* — R. A. Smith
(74) *Attorney, Agent, or Firm* — Everman Law Firm, PA; Gregory R. Everman

(57) ABSTRACT

An impact indicator for sports equipment includes an indicating portion having an inner end disposed adjacent an attachment portion and an outer end closed by a sight glass. The indicating portion contains a first component and a second component that react with one another to produce a visual indication in response to an impact event that exceeds a predetermined threshold. The first component may be a first fluid and the second component may be a second fluid. The first fluid mixes with the second fluid in response to the impact event and causes a change in a physical property and/or appearance of a mixture of the first fluid and the second fluid that is visible through the sight glass from the exterior of the sports equipment.

5 Claims, 5 Drawing Sheets

(56) References Cited

U.S. PATENT DOCUMENTS

| | | | |
|---|---|---|---|
| 8,621,673 B1* | 1/2014 | Pietrantonio | A61B 5/4076 2/410 |
| 9,103,849 B2* | 8/2015 | Branch | G01P 15/04 |
| 2006/0038694 A1* | 2/2006 | Naunheim | A42B 3/046 340/665 |
| 2012/0312071 A1 | 12/2012 | Branch | |
| 2014/0318436 A1* | 10/2014 | Schonberg | B65D 79/02 116/203 |
| 2015/0238143 A1* | 8/2015 | Meurer | A61B 5/6803 600/595 |

OTHER PUBLICATIONS

Reebok and MC10. Web-page: http://www.engadget.com/2013/01/11/mc10-reebok-checklight-hands-on/.

Glow Stick Factory. Web-page: http://www.glowstickfactory.com/pages/How-Do-Glow-Sticks-Work%3F.html.

* cited by examiner

IMPACT INDICATOR FOR SPORTS EQUIPMENT

FIELD OF THE INVENTION

The present invention relates generally to safety devices and methods for sports equipment. More particularly, the invention is an impact indicator for sports equipment that is configured to provide a visual indicator when an impact force exceeds a predetermined threshold. In an advantageous embodiment, the invention is an impact indicator that is embedded within a helmet to provide a visual indicator of a possible concussion injury to an athlete wearing the helmet.

BACKGROUND OF THE INVENTION AND RELATED ART

Athletes in all sports and at all levels are stronger, faster and more physical than ever before. According to the United States Centers for Disease Control and Prevention, approximately 200,000 people suffer at least one concussion while playing sports every year in the United States. Sports concussions can occur in almost any sport or recreational activity. However, sports concussions occur more frequently, and are typically more severe, in physical contact sports, such as football, basketball, soccer, lacrosse, ice hockey and field hockey. The National Collegiate Athletic Association (NCAA) recently settled a class action lawsuit by agreeing to create a seventy million dollar ($70,000,000) fund to diagnose current and former NCAA athletes to determine if they suffer from brain trauma as a result of a sports concussion incurred while participating in football, hockey, soccer and other contact sports.

A concussion occurs when a force causes the brain to rapidly move back and forth inside the skull as a result of a direct impact or an impact to the body that causes the head to quickly rotate. Concussions typically take the form of a mild, but traumatic brain injury that temporarily impairs how the brain functions and processes information. For example, a concussion may cause temporary loss of balance, coordination, memory and/or speech. Thankfully, most athletes fully recover from a sports concussion given a sufficient period of time for the healing process. Sports concussions are typically short lived and the athlete usually recovers completely within seven to ten days. Unfortunately, once an athlete has suffered a concussion, he or she is at significantly greater risk to suffer an additional concussion. In addition, repeat concussions have a cumulative effect and can result in long-term adverse consequences. Thus, the prevention of sports concussions is essential.

Absent total prevention, early recognition and proper treatment of sports concussions greatly reduces the likelihood of repeat concussions and their long term adverse effects. It is now known that recognizing sports concussion and providing proper treatment is especially important to younger athletes because they typically require a longer period to time to recover fully. However, the symptoms of a concussion are not always readily apparent. It is commonly assumed that concussion causes loss of consciousness. But in fact, many athletes that have suffered a concussion are not "knocked out." Further problematic is that the symptoms of a concussion are varied and time dependent. Certain symptoms manifest immediately, while other symptoms are delayed up to several days following the initial injury. In addition, some symptoms are physical, such as drowsiness and dizziness, while some are cognitive, such as memory loss and heightened emotion. Consequently, coaches, parents and even physicians are not always able to recognize that a concussion injury has occurred, and/or the likely severity of the injury.

The limited liability company Battle Sports Science of Omaha, Nebr., has developed and is marketing a visual impact indicator for use with a sports helmet. The impact indicator is embedded in a chinstrap that attaches to the helmet and includes a rechargeable battery, a micro-sensor, micro-circuitry, associated software and a light-emitting diode (LED). When charged, the battery powers the micro-circuitry that activates and monitors the micro-sensor and illuminates the LED. The micro-sensor, micro-circuitry and associated software measure and calculate the force and direction of an impact to the helmet and compare the severity of the impact against the widely accepted Head Injury Criterion (HIC) levels. In the event that an impact to the helmet exceeds the applicable HIC level, the micro-circuitry and associated software illuminates the LED, for example in the form of a flashing red indicator light to attract the attention of a coach, a referee, or another athlete.

The Battle Sports Science chinstrap impact indicator is fairly effective for recognizing when an impact force has occurred that is severe enough to potentially cause a concussion injury. However, the chinstrap impact indicator suffers from several deficiencies. Firstly, the battery must be sufficiently charged to power the micro-circuitry and other electronic components necessary to measure, calculate and compare an impact force to HIC levels and to subsequently illuminate the LED in the event that the impact force exceeds the applicable HIC level. Secondly, the micro-sensor, micro-circuitry and associated software are expensive, sensitive electronic components that are susceptible to failure during normal use due to the severity of the operating environment and the harsh physical environment of many sports and recreational activities. In fact, the more severe an impact force is the more likely it is that the electronic components of the chinstrap impact indicator will fail. Finally, the chinstrap impact indicator relies on the measurement of an impact force that typically occurs at a location remote from the chinstrap, such as the crown of the helmet or the rear of the helmet. As a result, the chinstrap impact indicator is inherently less reliable for determining whether a potentially injurious impact force has occurred at a location remote from the chinstrap.

In view of the aforementioned deficiencies in known impact indicators, there exists a need for an improved safety device and method for sports equipment. More particularly, there exists a need for an impact indicator for sports equipment that is configured to visually indicate when an athlete has suffered an impact force severe enough to potentially cause a concussion. There exists a further and more specific need for a cost-effective and reliable impact indicator for a sports helmet that is configured to provide a visual indicator when an area remote from the chinstrap of the helmet is subjected to an impact force that exceeds a predetermined threshold, and therefore, could potentially cause a sports concussion injury to an athlete that is wearing the helmet while participating in a sports or recreational activity.

SUMMARY OF THE INVENTION

In one aspect, the invention is embodied by an impact indicator for sports equipment including an indicating portion having an inner end and an opposite outer end, and an attachment portion operable for securing the impact indicator to the sports equipment. The outer end of the indicating portion is disposed adjacent an outer surface of the sports equipment and is closed by a sight glass, and the indicating portion contains a first component and a second component that react with one another to produce a visual indication in response to an impact event that exceeds a predetermined threshold. In one embodiment, the first component mixes with the second component to cause a change in a physical property and/or appearance, such as a color of the mixture, a light emission or the like. In still another embodiment, the sight glass is made of a material that is substantially transparent or sufficiently translucent such that the visual indication is visible through the material of the sight glass from the exterior of the sports equipment. In yet another embodiment, the first component is a first fluid and the second component is a second fluid, and the first fluid mixes with the second fluid in response to an impact event that exceeds the predetermined threshold. In another embodiment, the inner end of the indicating portion is disposed adjacent the attachment portion. The attachment portion may include external threads that engage corresponding internal threads provided on an opening formed through the sports equipment. Alternatively, the attachment portion may include a sheet, layer or strip of an attachment material for attaching the impact indicator directly to the sports equipment. Alternatively, the attachment portion may include a plate having at least one fastener feature for attaching the impact indicator to a complementary fastener feature provided on the sports equipment.

In another aspect, the invention is embodied by a helmet for sports and recreational activities including a shell having an exterior surface and an opening formed therethrough, and an impact indicator configured to be inserted within the opening and attached to the shell of the helmet. The impact indicator includes an indicating portion having an inner end and an outer end, and an attachment portion configured for attaching the impact indicator to the shell of the helmet. The inner end of the indicating portion is disposed adjacent the attachment portion and the outer end of the indicating portion is closed by a sight glass. The indicating portion contains a first component and a second component that react with one another to produce a visual indication in response to an impact event that exceeds a predetermined threshold. In one embodiment, the first component is a first fluid and the second component is a second fluid. An impact event equal to at least the predetermined threshold causes the first fluid to mix with the second fluid and thereby produce a change in a physical property and/or appearance, such as a color or a light emission, visible through the sight glass of the indicating portion. In a particular embodiment, the change in the physical property and/or appearance is a color and the sight glass is made of a material that is substantially transparent or sufficiently translucent such that the change in color is visible through the sight glass from the exterior of the shell of the helmet. In another embodiment, the attachment portion includes an attachment means selected from the group consisting of external threads that engage corresponding internal threads provided on the opening formed through the shell of the helmet for attaching the impact indicator to the helmet, a sheet, layer or strip of an attachment material for attaching the impact indicator to the helmet, and a plate having at least one fastener feature extending therefrom for engaging a complementary fastener feature provided on an inner surface of the shell of the helmet.

In yet another aspect, the invention is embodied by a method for determining and visually indicating an impact event experienced by an item of sports equipment that exceeds a predetermined threshold. The method includes providing an item of sports equipment. The method further includes providing an impact indicator configured for attachment to the item of sports equipment. The impact indicator includes an indicating portion closed by a sight glass. The indicating portion contains a first component and a second component. The method further includes reacting the first component and the second component with one another to produce a visual indication in response to the impact event that exceeds the predetermined threshold. The method further includes observing the visual indication to thereby recognize an impact event that could potentially cause a sports injury to a wearer of the sports equipment. In one embodiment, the first component is a first fluid and the second component is a second fluid, and reacting the first component and the second component with one another further includes causing the first fluid to mix with the second fluid to produce a change in a physical property and/or appearance that is visible through the sight glass of the impact indicator. In a particular embodiment, the change in the physical property and/or appearance is a change in the color of a mixture of the first fluid and the second fluid. In another embodiment, the change in the physical property and/or appearance is an emission of light. In still another embodiment, the sight glass is made of a material that is substantially transparent or sufficiently translucent such that the visual indication is visible through the sight glass from the exterior of the item of sports equipment.

Other aspects, objects, features and advantages of the invention will be made apparent or will be readily understood and appreciated by those skilled in the related art as the invention is described in greater detail hereinafter and is shown in the accompanying drawing figures. It is envisioned that all such aspects, objects, features and advantages of the invention as shown and described herein will be within the intended broad scope of the appended claims. The above and other aspects, objects, features and advantages may be accomplished by any of the exemplary embodiments of the invention described herein and illustrated in the accompanying drawings. However, it should be appreciated that the drawing figures are for illustrative purposes only, and that many modifications, changes, revisions and substitutions may be made to the exemplary embodiments illustrated herein without departing from the broadest reasonable interpretation of the appended claims.

BRIEF DESCRIPTION OF THE DRAWINGS

The aforementioned objects, features and attendant advantages of the invention will be more fully understood and appreciated when considered in conjunction with the accompanying drawings, in which like reference characters designate the same or similar parts throughout the several views.

DETAILED DESCRIPTION OF THE EXEMPLARY EMBODIMENTS

Figure 1:
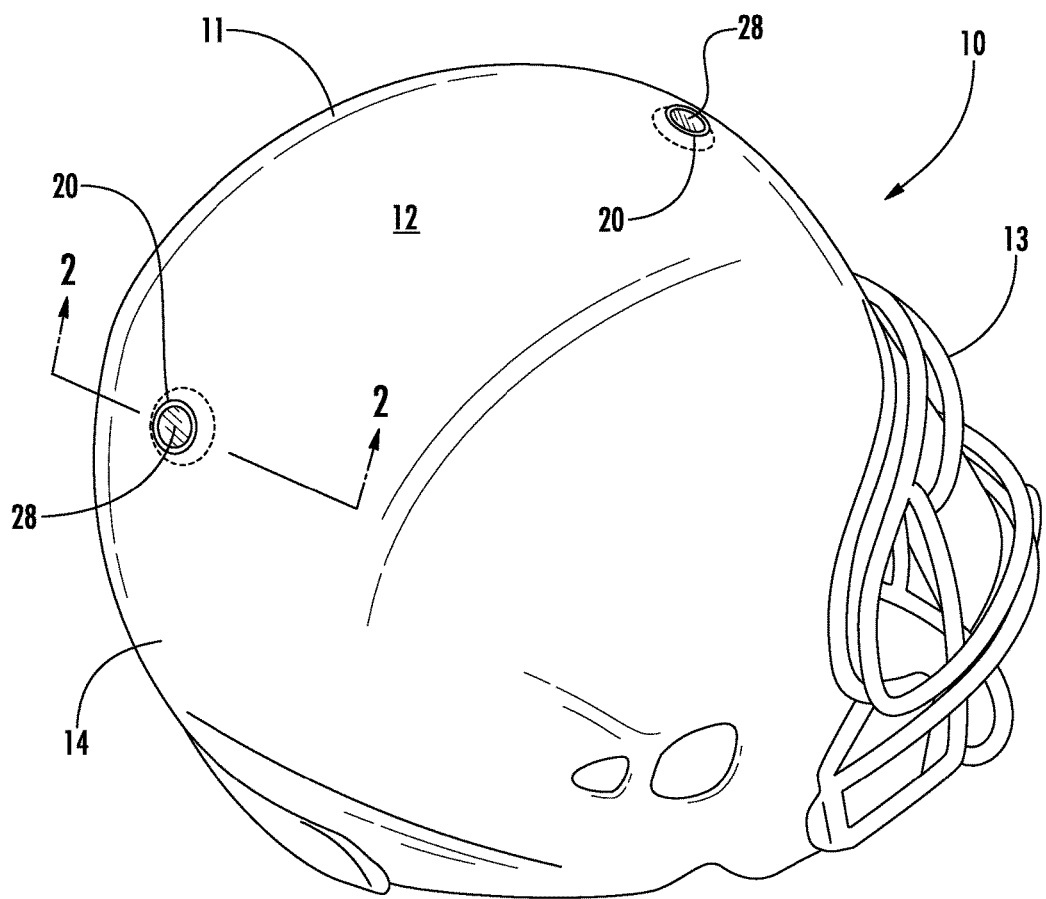
FIG. 1 is an environmental perspective view illustrating a sports helmet including an impact indicator according to an exemplary embodiment of the invention.
Figure 2:
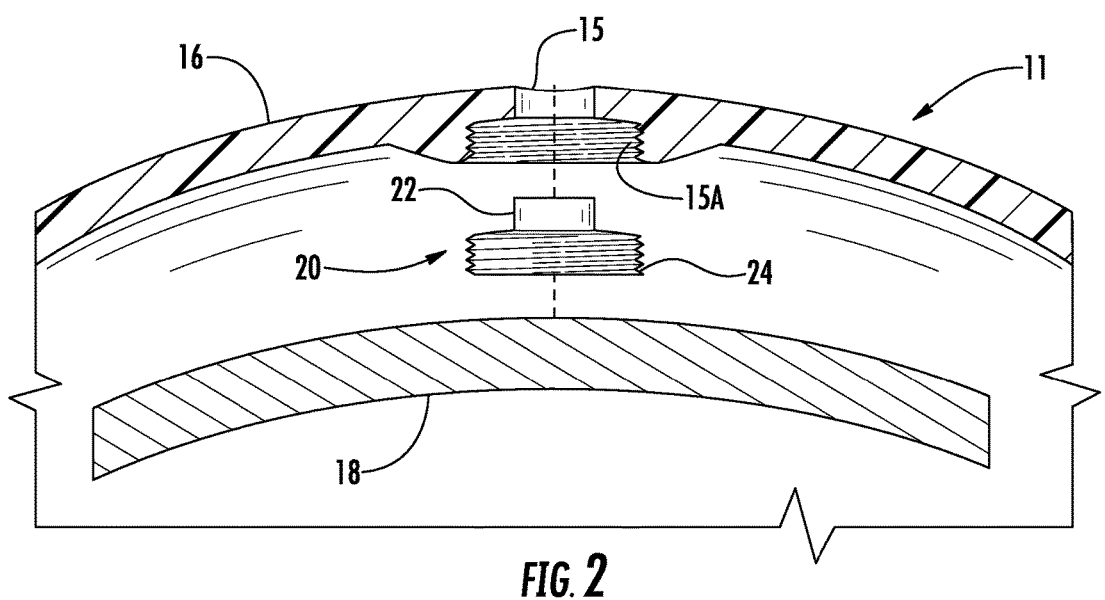
FIG. 2 is an exploded partial section view taken along the line 2-2 in FIG. 1 showing the helmet and the impact indicator of FIG. 1 in greater detail.

FIG. 1 and FIG. 2 show an example of an item of sports equipment, designated generally by reference character 10, including an impact indicator, designated generally at 20, according to an exemplary embodiment of the invention. In the exemplary embodiment shown and described herein, the sports equipment 10 is a helmet 11 of the type commonly utilized by athletes engaging in contact sports, such as football, lacrosse, ice hockey and field hockey. However, the item of sports equipment 10 may also be a helmet of the type commonly utilized by athletes participating in automobile, motorcycle, snowmobile, watercraft or bicycle racing, as well as athletes competing in boxing, ultimate fighting, martial arts and like events. In general, the sports equipment 10 may be any type of helmet utilized in any sports and/or recreational game, contest or event for the purpose of protecting an athlete's head from an impact force that is severe enough to potentially cause a concussion injury. In fact, the concept of the invention is applicable to any item of sports equipment useable for protecting any portion of a participant's body from an impact force, including without limitation, shoulder pads, elbow pads, hip pads, knee pads, wrist guards, shin guards, ankle guards and the like. Regardless, the impact indicator 20 is configured to provide a visual indication in the event that an impact force exceeds a predetermined threshold. Thus, the impact indicator 20 may be embodied in any device and/or method configured to visually indicate when an impact force or an acceleration event has occurred that is sufficient to potentially cause any injury to an athlete or participant utilizing an item of sports equipment 10 that includes an impact indicator according to the present invention.

As illustrated in FIG. 1, the impact indicator 20 may be located proximate the crown 12 of the helmet 11 in the direction of a front portion or face guard 13 of the helmet. Additionally, or alternatively, the impact indicator 20 may be located proximate the crown 12 of the helmet 11 in the direction of a rear portion 14 of the helmet. The specific locations of the impact indicator 20 illustrated in the exemplary embodiment provided herein represent areas of the helmet 11, for example a football helmet, that are routinely subjected to an impact force. The illustrated locations further represent positions on the helmet 11 that are readily visible to coaches, referees and other athletes or participants of a sports and/or recreational game, contest or event. As such, the specific locations of the impact indicator(s) 20 illustrated herein achieve certain advantages and objectives of the invention, namely proximity to likely impact locations and high visibility positions. However, an impact indicator 20 according to the invention may be positioned at any location on any item of sports equipment 10 suitable for reliably determining and visually indicating when an impact force or an acceleration event has occurred that is sufficiently severe to potentially cause a sports injury, such as a concussion.

As shown in FIG. 2, the impact indicator 20 comprises an upper indicating portion 22 and a lower attachment portion 24. In the exemplary embodiments of the impact indicator 20 provided herein, the indicating portion 22 is configured as a generally hollow cylinder defining an internal cavity. The indicating portion 22 includes an inner end that is disposed within the attachment portion 24 of the impact indicator. The opposite outer end of the cylindrical indicating portion 22 is closed by a substantially transparent or sufficiently translucent sight glass 28, for a purpose to be described hereafter. Although the indicating portion 22 is shown and described by way of illustration as being cylindrical, indicating portion 22 may have any shape and/or geometry suitable for accomplishing the functions and purposes described herein. For example, in other embodiments, the indicating portion 22 may be an elongate, substantially hollow tube defining an internal cavity and having a generally square, rectangular or polygonal cross-section.

FIG. 2 shows the impact indicator 20 is disposed within an opening 15 formed through the thickness of a shell portion 16 of the helmet 11. If desired, the thickness of the shell portion 16 of the helmet 11 may be increased as necessary to accommodate the additional height (i.e., depth) of the impact indicator 20. However, it is envisioned that the impact indicator 20 may be configured to have a height (i.e., depth) no greater than the thickness of the shell portion 16 of the helmet 11. Accordingly, FIG. 2 shows the height (i.e., depth) of the impact indicator 20 being greater than the thickness of the shell portion 16 of the helmet 11 for purposes of illustration, and not limitation. Regardless, the impact indicator 20 is disposed and attached, affixed, adhered, secured or otherwise retained within the opening 15 of the shell portion 16 of the helmet 11 in any suitable manner, certain examples of which will be provided hereinafter. The impact indicator 20 is typically covered on the inside of the helmet 11 by a section, portion or the like of conventional padding 18. However, padding 18 is optional and may be eliminated or replaced by any insert or the like suitable for preventing the attachment portion 24 of the impact indicator 20 and/or the shell portion 16 of the helmet 11 from uncomfortably contacting the head of a person wearing the helmet.

Figure 3A:
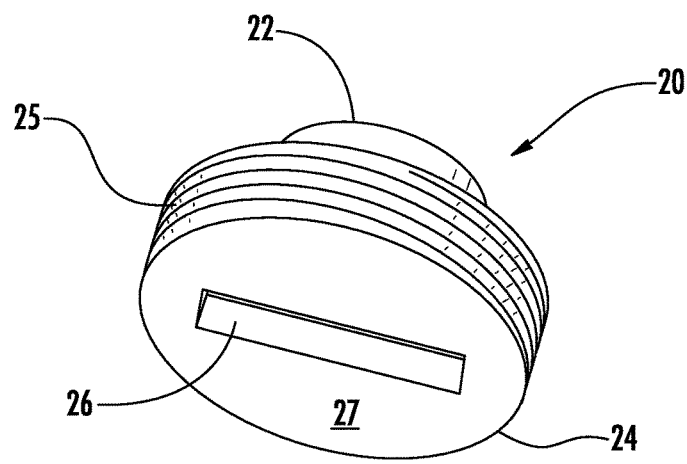
FIG. 3A is a bottom perspective view showing an exemplary embodiment of an impact indicator according to the invention.
Figure 3B:
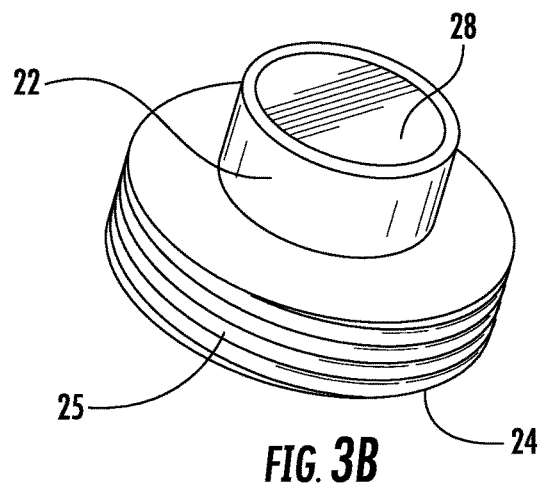
FIG. 3B is a top perspective view of the impact indicator of FIG. 3A.

FIG. 3A and FIG. 3B show an exemplary embodiment of the impact indicator 20 in greater detail. Specifically, FIGS. 3A and 3B show the attachment portion 24 having external threads 25, for engaging corresponding internal threads 15A (FIG. 2) provided within the opening 15 formed through the shell portion 16 of the helmet 11. As illustrated in FIG. 3A, a groove, slot, recess or the like 26 may be formed in an external bottom surface 27 of the attachment portion 24 for the purpose applying a tool such as a slotted screw driver for turning and thereby engaging the external threads 25 of the attachment portion 24 with the internal threads 15A of the opening 15 to secure the impact indicator 20 within the opening 15 of the shell portion 16 of the helmet 11 with the indicating portion 22 disposed within the opening. Impact indicator 20, opening 15 and the thickness of shell portion 16 are dimensioned such that the sight glass 28 at the outer end of the indicating portion 22 of the impact indicator 20 is substantially flush with, essentially flush, or slightly recessed, relative to an outer surface of the shell portion of the helmet 11. In this manner, the impact indicator 20 does not protrude beyond the outer surface of the shell portion 16 of the helmet 11. As a result, the sight glass 28 is not subjected to excessive damage, while remaining readily visible to an observer, for example a coach, referee, or another athlete or participant. The importance of the visibility of the sight glass 28 will be made apparent by alternative embodiments of the impact indicator described hereinafter.

Figure 3C:
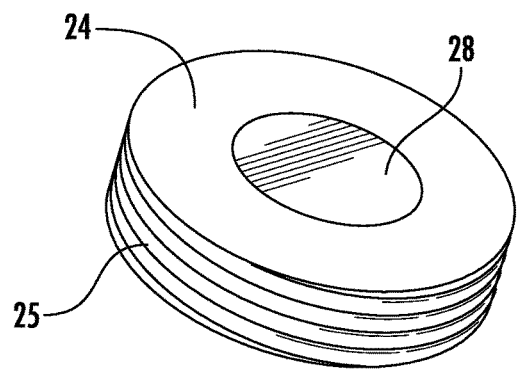
FIG. 3C is a top perspective view of another exemplary embodiment of an impact indicator according to the invention.

FIG. 3C shows another exemplary embodiment of an impact indicator 20 suitable for use with the invention. In the embodiment of the impact indicator 20 shown in FIG. 3C, the attachment portion 24 comprises a generally hollow cylinder defining an internal cavity. The indicating portion 22 of the impact indicator 20 is disposed either partially or entirely within the internal cavity defined by the attachment portion 24. As previously described with respect to the embodiment of the impact indicator 20 shown in FIG. 3A and FIG. 3B, the attachment portion 24 is provided with external threads 25, for engaging corresponding internal threads 15A (FIG. 2) provided within the opening 15 formed through the shell portion 16 of the helmet 11. Although not shown, means for engaging the external threads 25 of the attachment portion 24 of the impact indicator 20 with the internal threads 15A of the shell portion 16 of the helmet 11 may be provided on one or both of the opposing ends of the attachment portion. By way of example and not limitation, a slot may be provided in the may be formed in the external bottom surface 27 of the attachment portion 24 as previously described. As another example, a pair of slots (not shown) may be provided in the inner end of the attachment portion 24 to be engaged by a tool that rotates the impact indicator to engage the external threads 25 with the internal threads 15A within opening 15 formed in shell 16 of helmet 11. In this manner, the impact indicator 20 may be threaded into the opening 15 with reduced profile, and potentially, without the need to build-up the shell portion 16 of the helmet 11.

Figure 4A:
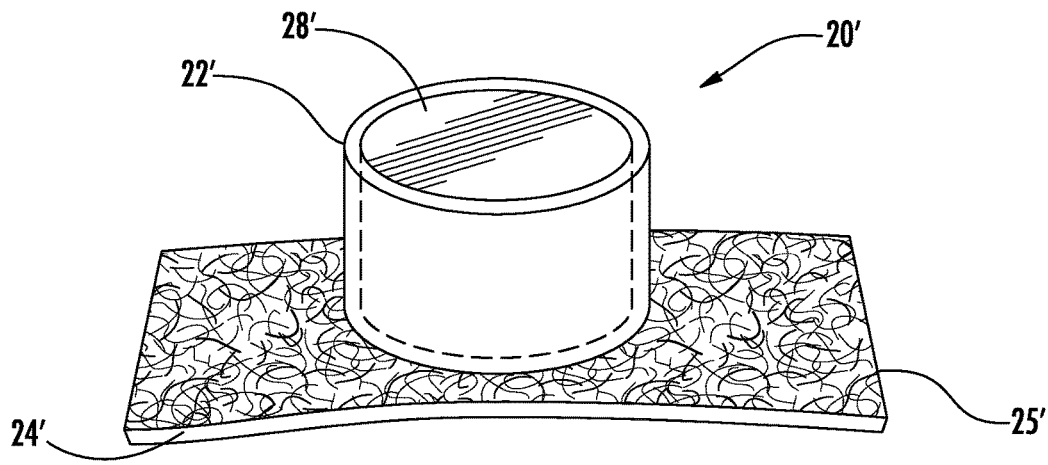
FIG. 4A is a perspective view showing another exemplary embodiment of an impact indicator according to the invention.
Figure 4B:
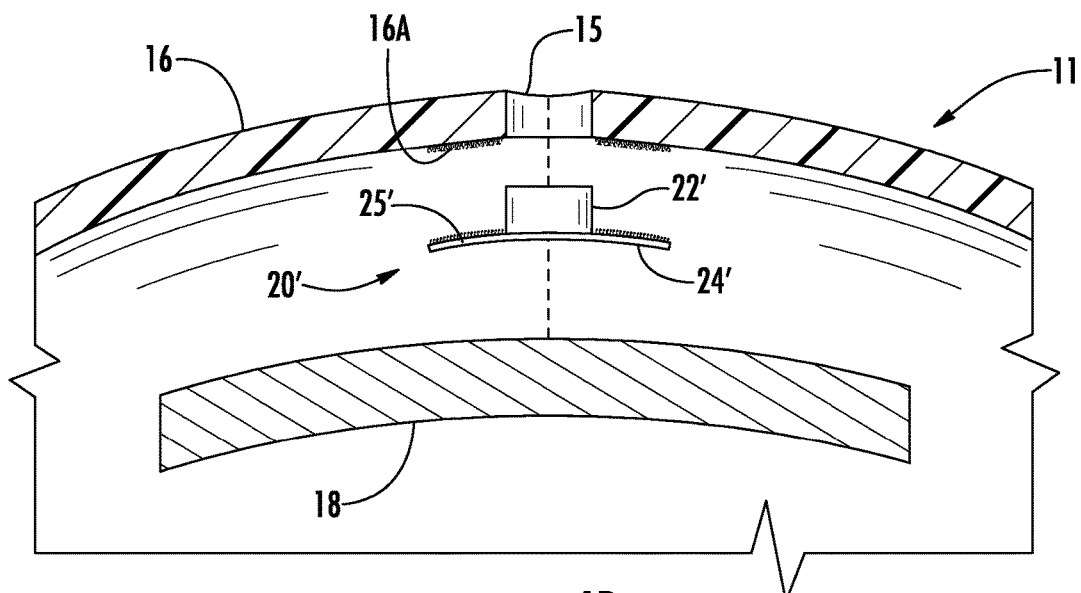
FIG. 4B is an exploded partial section view similar to FIG. 2 showing the helmet and the impact indicator of FIG. 4A in greater detail.

FIG. 4A shows another exemplary embodiment of an impact indicator 20' according to the invention. Impact indicator 20' comprises an upper indicating portion 22' and a lower attachment portion 24'. As previously mentioned, an outer end of the indicating portion 22' is closed by a substantially transparent or sufficiently translucent sight glass 28'. In the embodiment of FIG. 4A, the attachment portion 24' comprises an elongate, relatively thin sheet, layer or strip having an attachment material 25', such as a hook-and-loop type fastener commonly known as Velcro®. Alternatively, the attachment material 25' may be an adhesive if it is desired to more permanently attach the impact indicator 20' to the helmet 11. FIG. 4B illustrates that the indicating portion 22' of the impact indicator 20' is inserted within the opening 15 formed through the shell portion 16 of the helmet 11, disposed relative to the helmet 11 as previously described with reference to FIG. 2, and the sheet, layer or strip of Velcro® attachment material 25' is engaged with complementary hook-and-loop Velcro® 16A provided on an inner surface of the shell portion 16 of the helmet 11. Alternatively, an adhesive attachment material 25' may be directly adhered to the inner surface of the shell portion 16 of the helmet 11.

Figure 5A:
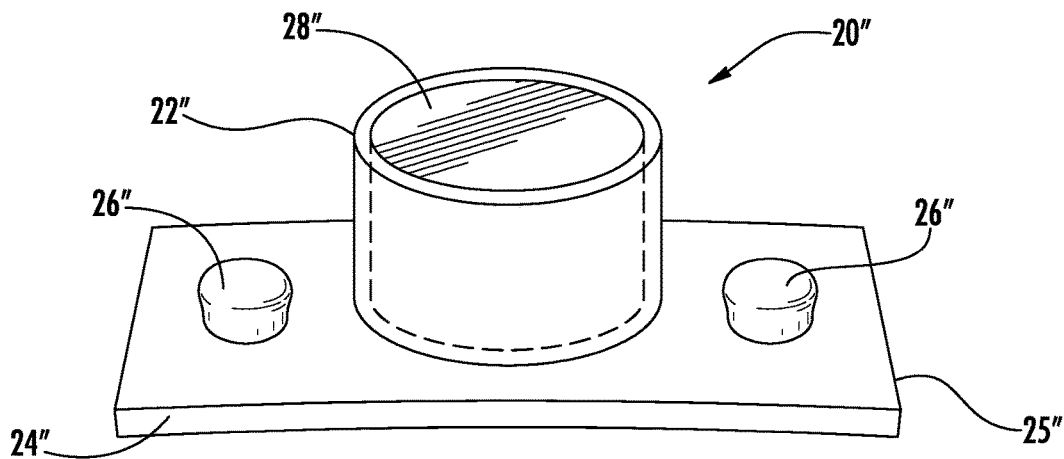
FIG. 5A is a perspective view showing another exemplary embodiment of an impact indicator according to the invention.
Figure 5B:
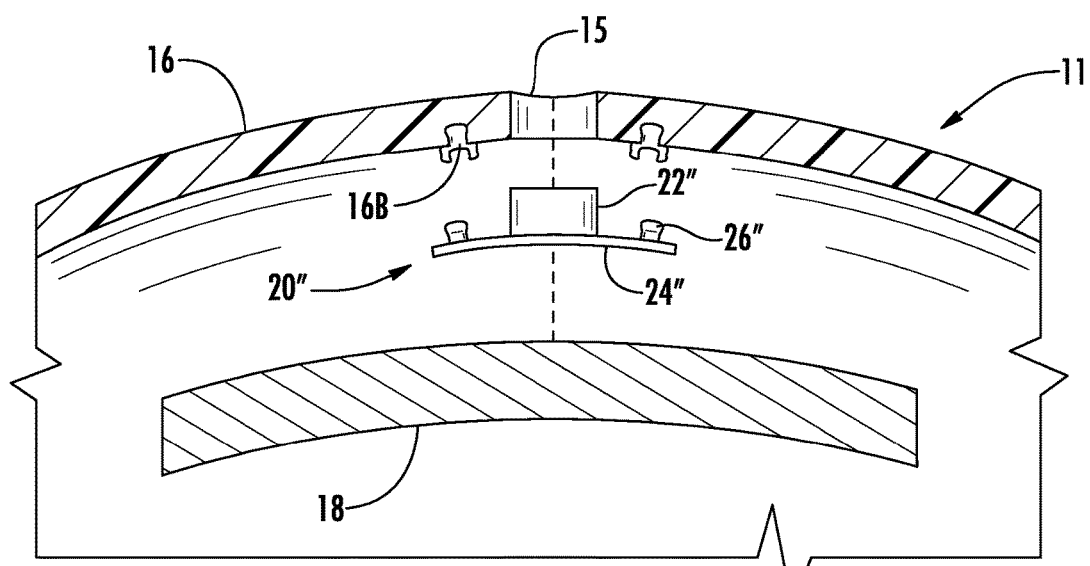
FIG. 5B is an exploded partial section view similar to FIG. 2 showing the helmet and the impact indicator of FIG. 5A in greater detail.

FIG. 5A shows another exemplary embodiment of an impact indicator 20" according to the invention. Impact indicator 20" comprises an upper indicating portion 22" and a lower attachment portion 24". As previously mentioned, an outer end of the indicating portion 22" is closed by a substantially transparent or sufficiently translucent sight glass 28". In the embodiment of FIG. 5A, the attachment portion 24" comprises an elongate plate 25" having at least one fastener feature 26" provided thereon and extending upwards in the direction of the indicating portion 22". The fastener feature 26" may be any component suitable for securing the impact indicator 20" to the helmet 11. FIG. 5B illustrates that the indicating portion 22" of the impact indicator 20" is inserted within the opening 15 formed through the shell portion 16 of the helmet 11, disposed relative to the helmet 11 as previously described with reference to FIG. 2, and each fastener feature 26" is engaged with a complementary fastener feature 16B provided in the inner surface of the shell portion 16 of the helmet 11. In a particular embodiment, each fastener 26" may be a conventional snap fastener 26" configured to engage a complementary snap receiver 16B disposed within a recess formed in the inner surface of the shell portion 16 of the helmet 11. Alternatively, a relatively resilient insert 16B may be disposed within the inner surface of the shell portion 16 of the helmet 11 and configured to receive the snap fastener 26". In another suitable embodiment, each fastener feature 26" may be a threaded machine screw configured to engage a complementary threaded insert (e.g., tap) provided on the inner surface of the shell portion 16 of the helmet 11. Other suitable embodiments of a fastener feature 26" will be readily apparent to those skilled in the relevant art, and accordingly, are intended to be encompassed by the broad concepts of the present invention. Regardless, the one or more fasteners 26" operate to secure the impact indicator 20" to the inner surface of the shell portion 16 of the helmet 11 within the opening 15.

Figure 6A:
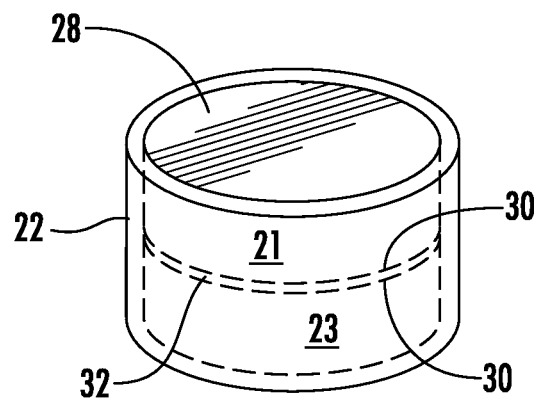
FIG. 6A is a perspective view showing an exemplary embodiment of an indicating portion for use with the impact indicators shown and described herein.
Figure 6B:
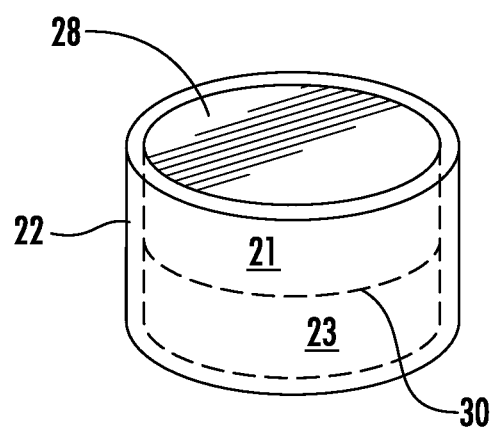
FIG. 6B is a perspective view showing another exemplary embodiment of an indicating portion for use with the impact indicators shown and described herein.

FIG. 6A and FIG. 6B show exemplary embodiments of an indicating portion 22 that is suitable for use with an impact indicator 20 according to the invention. For example, each indicating portion 22 is useable with any attachment portion 24, 24', 24" (hereinafter collectively attachment portion 24) of any impact indicator 20, 20', 20" (hereinafter collectively impact indicator 20) previously shown and described. The internal cavity defined by the generally hollow indicating portion 22 contains a first component 21 and a second component 23 separated by at least one relatively thin membrane 30. As illustrated by the embodiment shown in FIG. 6A, first component 21 and second component 23 may be contained within separate chambers of the indicating portion 22 defined by membranes 30 with a void space 32 disposed therebetween. Void space 32 may be an air gap. Alternatively, void space 32 may be filled with a third component, a liquid, a solid or a gas, that mixes with at least one of the first component 21 and the second component 23 when at least one of the membranes 30 is broken or ruptured. Furthermore, the predetermined threshold, or extent of the impact event required to rupture the membrane(s) 30, and thereby, produce a change in a physical property and/or appearance of the mixture may be tuned as desired by varying the viscosities of the first and second liquid components 21, 23 and/or component within the void space 32, and/or the strength of the membrane(s) 30, as well as other design considerations.

In an alternative embodiment illustrated in FIG. 6B, the first component 21 and the second component 23 may be contained within separate chambers separated by a single relatively thin membrane 30 without a void space disposed therebetween. The first component 21 may be a first fluid having a first viscosity and the second component 23 may be a second fluid having a second viscosity different than the first viscosity of the first fluid so as to rupture the membrane 30 in response to an impact event that exceeds a predetermined threshold, or maximum. It with the broad concepts of the present invention that a first component 21 having a first viscosity and a second component 23 having a second viscosity greater than the first viscosity, or vice versa, may alternatively be contained within the internal cavity defined by the indicating portion 22 without any membrane(s) 30 and without a void space 32. Furthermore, the first component 21 and/or the second component 23 may be a solid rather than a liquid that reacts with the other component in a chemical reaction to produce a change in a physical property and/or appearance of the mixture, as will be described in greater detail hereinafter. Furthermore, the predetermined threshold, or extent of the impact event required to rupture the membrane(s) 30, and thereby, produce a change in a physical property and/or appearance of the mixture may be tuned as desired by varying the differences in the viscosities of the first and second liquid components 21, 23, and/or the strength of the membrane(s) 30, as well as other design considerations.

For purposes of the present invention, it is only necessary that the first component 21 and the second component 23 react together in response to an impact force or an acceleration event, individually and collectively also referred to herein as an "impact event," that is greater than a predetermined threshold to produce a visually identifiable change in a physical property and/or appearance of at least one of the components. By way of example only and not limitation, at least one of the first component 21 and the second component 23 may combine with the other in response to an impact event greater than the predetermined threshold to produce a change in at least one of the components that is visually identifiable through the substantially transparent or sufficiently translucent sight glass 28.

In one embodiment, the first component 21 is a first fluid and the second component 23 is a second fluid, wherein at least a portion of the first fluid mixes into at least a portion of the second fluid in response to the occurrence of a sufficiently severe impact event experienced by the impact indicator 20. The impact event produces a change in the color of at least one of the fluids that is a visual indication of the impact event. An impact indicator that produces a change of color upon exceeding a threshold impact is and method is described in World Intellectual Property Organization (WIPO) Publication No. WO2012170252 A2 and United States Patent Application Publication No. 2012/0312071 published on Dec. 13, 2012, the entire disclosures of which are incorporated herein by reference. Impact indicators of the type shown and described in the aforementioned publications and commercially available from ShockWatch, Inc. of Dallas, Tex., are currently utilized in the shipping industry to identify shipping containers, packages and the like that may have been damaged during transit as a result of an impact event that exceeds a predetermined threshold.

In another embodiment, the first component 21 is a first fluid or solid composition and the second component 23 is a second fluid or solid composition. As illustrated by FIG. 6B, the first component 21 is disposed within a first chamber of the indicating portion 22 and the second component 23 is disposed within a second chamber of the indicating portion 22, wherein the first chamber and the second chamber are separated by a membrane 30. The membrane 30 is configured to rupture in response to an impact event that exceeds a predetermined threshold such that the first component 21 disposed within the first chamber and the second component 23 disposed within the second chamber mix with one another. The mixing of the first component 21 and the second component 23 results in a chemical reaction that produces a change in a physical property and/or appearance of the mixture. In a particular example, the chemical reaction produces a light emission. More specifically, the first component 21 and the second component 23 comprise chemical compounds that when mixed together create thermal energy. The thermal energy excites atoms in the mixture and causes the atoms to release photons that produce visible light. The aforementioned process is exemplified by the operation of a conventional "glow stick" which comprises a fragile glass vial containing a hydrogen peroxide solution that is disposed within a larger vial containing a phenyl oxalate ester and fluorescent dye solution and made of a relatively soft plastic material. When the plastic vial is sufficiently bent, the smaller, glass vial breaks or shatters thereby releasing the hydrogen peroxide solution into the phenyl oxalate ester solution. The resulting chemical reaction between the solutions produces visible light in the color of the fluorescent dye.

It should be noted that the first component 21 and the second component 23 contained within separate compartments, chambers or the like, may be oriented in any desired direction relative to one another and/or relative to the item of sports equipment 10. By way of example only and not limitation, the first component 21 and the second component 23 may be arranged one on top of the other, side by side, diagonally to one another, one disposed within the other or at any other desired orientation. In addition, the first component 21 and the second component 23 may comprise a liquid, a solid, or a gas, or combinations thereof. Furthermore, the type, amount and/or relative viscosities (if different) of the first component 21 and the second component 23 and/or the number or composition of the membrane(s) 30 may be varied depending on the sport or recreational activity, the item of sports equipment 10, the location of the impact indicator 20 and/or the desired predetermined threshold of the impact event. In this manner, the impact indicator 20 may be customized for use in connection with a particular sports or recreational activity, or on a particular item of sports equipment 10. For example, the predetermined threshold necessary to activate the visual indication of the impact indicator 20 may be adjusted by varying the type, amount and relative viscosities (if different) of the first component 21 and the second component 23. By way of example and not limitation, an impact indicator 20 having a lesser predetermined threshold may be provided for use with a football helmet 11 intended to be worn by youngsters between eight and twelve years of age during organized youth football practices and games, while an impact indicator 20 having a greater predetermined threshold may be provided for use with a football helmet 11 intended to be worn by teenage boys between ages thirteen and seventeen participating in organized high school and traveling team football practices and games. An impact indicator 20 having an even greater predetermined threshold could then be provided for use with a football helmet 11 intended to be worn by adults participating in club, college, semi-professional and professional football practices and games. By way of example and in context of football, the impact indicator 20 can be configured to provide a visual indication in response to an impact event that exceeds a predetermined threshold of g-force acceleration of 50 g for youths, 60 g for youths 8 to 14 years old, 70 g for teens 15 to 17 years old, and 80 g for adults at least 18 years old.

Regardless of the foregoing detailed description of exemplary embodiments of the invention, the optimum dimensional relationships for the individual components of the invention, including variations in size, shape, thickness, form, materials, function and manner of operation, assembly and use, as well as equivalents thereof, are deemed to be readily apparent and understood by those skilled in the art. Accordingly, equivalent relationships to those shown in the accompanying drawing figures and described in the written description are intended to be encompassed by the invention, the foregoing being considered as illustrative only of the general concept and principles of the invention. Furthermore, since numerous modifications and changes will readily occur to those skilled in the art, the exemplary embodiments disclosed herein are not intended to limit the invention to the specific configuration, construction, materials and operation shown and described. Instead, all reasonably predictable and suitable equivalents and obvious modifications to the invention should be construed as falling within the scope of the invention as defined by the appended claims given their broadest reasonable interpretation in view of the accompanying written description and drawings.

That which is claimed is:

1. A helmet for sports and recreational activities, comprising:
   a shell having an exterior surface and an opening formed therethrough; and
   an impact indicator configured to be inserted within the opening and attached to the shell of the helmet, the impact indicator comprising:
      an indicating portion having an inner end and an outer end; and
      an attachment portion configured for attaching the impact indicator to the shell of the helmet;
      wherein the outer end of the indicating portion is closed by a sight glass; and
      wherein the indicating portion contains a first component and a second component that react with one another to produce a visual indication in response to an impact event that exceeds a predetermined threshold.

2. The helmet of claim 1, wherein the impact indicator is configured to be substantially flush with the exterior surface of the shell when inserted within the opening and attached to the shell of the helmet.

3. The helmet of claim 2, wherein the attachment portion comprises an attachment means selected from the group consisting of external threads that engage corresponding internal threads provided on the opening formed through the shell of the helmet for attaching the impact indicator to the helmet, a sheet, layer or strip of an attachment material for attaching the impact indicator to the helmet, and a plate having at least one fastener feature extending therefrom for engaging a complementary fastener feature provided on an inner surface of the shell of the helmet.

4. The helmet of claim 1, wherein the first component is a first fluid and the second component is a second fluid, and wherein an impact event greater than the predetermined threshold causes the first fluid to mix with the second fluid and thereby produce a change in a physical property and/or appearance that is visible through the sight glass of the indicating portion.

5. The helmet of claim 4, wherein the change in the physical property and/or appearance is selected from the group consisting of a color and a light emission, and wherein the sight glass is made of a material that is substantially transparent or sufficiently translucent such that the change is visible through the sight glass from the exterior of the shell of the helmet.

* * * * *